Aug. 1, 1939. H. LEWIN 2,168,225
PHOTOGRAPHIC IMAGE AND METHOD OF AND APPARATUS FOR VIEWING THE SAME
Filed June 16, 1937
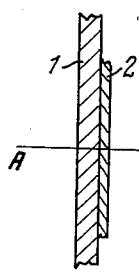
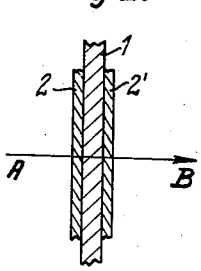
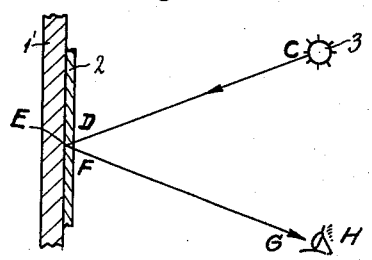
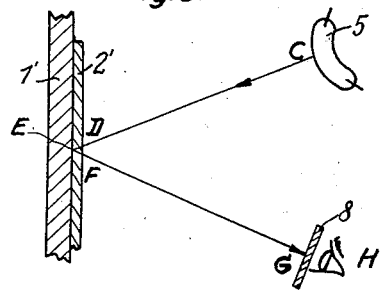
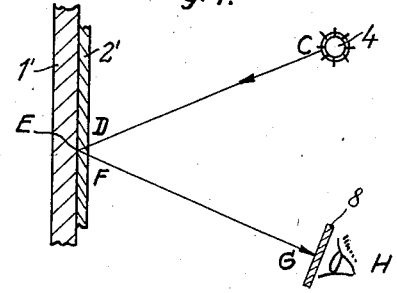
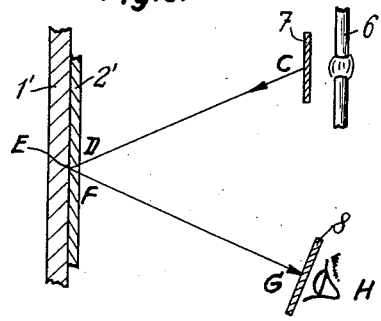
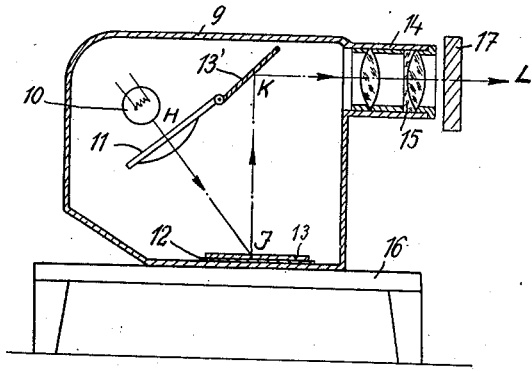
Inventor
H. Lewin
by
Attorney Patented Aug. 1, 1939

2,168,225

UNITED STATES PATENT OFFICE 2,168,225

PHOTOGRAPHIC IMAGE AND METHOD OF AND APPARATUS FOR VIEWING THE SAME

Hans Lewin, Hamburg, Germany

Application June 16, 1937, Serial No. 148,577
In Germany December 10, 1936

6 Claims. (Cl. 40—134)

The range of contrast in a picture or image produced or mounted on an opaque support, for example paper, whether by a photographic method, by a printing process, or in some other way is, as is well known, less than that of an image on a transparent support and especially of a diapositive having two layers. This difference is occasioned by reason of the fact that the image on paper is observed in incident light while the transparent picture is observed in transmitted light. Of course, the density or characteristic curve of an image on paper, although there is only one emulsion, is initially similar to the curve of a diapositive having two layers, as at the darkened portions there is a weakening both of the incident light and of the reflected light. However, flattening of the density-curve of the image on paper takes place materially earlier, namely at a density-value of 0.9. This means that in the case of an image on paper the contrast is greatly reduced in the region of greater density.

This rapid flattening of the density-curve is brought about as a result of surface reflection. As is well known, even at the darkest portions that can be produced on paper, reflection is never less than from a twentieth to a thirtieth of the reflection at the clearest portions, because light is reflected to a certain extent even from the surface of the substance employed for producing the image. In contradistinction to this, even the darkest gradations may be differentiated in the case of a transparency if the source of light that is employed is sufficiently bright.

The same conditions obtain in the case of projection by an episcope, that is in the projection of opaque objects by means of incident light, as in the case of simple observation. In this case the reduction of contrast is particularly noticeable, and pictures projected by an episcope appear on the screen as greatly lacking in contrast or flat.

The present invention has as its object to obtain an increase in the brightness of the fluorescent radiation.

According to the present invention, the support of the image contains or has added to it a material which under the action of monochromatic light from the visible part of the spectrum or under the simultaneous action of such light and invisible ultra-violet rays emits a fluorescent light of colour complementary to that of the mono-chromatic light. In the apparatus by means of which such a picture is viewed, a filter of the same colour as that of the fluorescent radiation, i. e. of a colour complementary to that of the mono-chromatic light, is interposed between the picture and the observer.

Rhodamine is an example of a substance which, under the action of a mono-chromatic light, lights up in a complementary colour. When illuminated with green light, it emits a red fluorescent light. Certain inorganic substances, such as certain zinc sulphides, behave in a similar way.

In the accompanying drawing like characters of reference indicate like parts in the several views, and:—

Figure 1 is a fragmentary section of a photographic film on which is formed the image referred to in this invention.

Figure 2 is a fragmentary section of a modified form of such film.

Figure 3 is a diagram showing one method of viewing such an image.

Figure 4 is a modified diagram similar to Fig. 3.

Figure 5 is a second modification of Fig. 3.

Figure 6 is a third modification of Fig. 3.

Figure 7 is a section through on episcope embodying this invention.

According to the existing methods of viewing diapositives, e. g., X-ray pictures, in transmitted light, a film was used consisting of a transparent support I (derivatives of cellulose, glass, etc.) with a superimposed layer or emulsion 2 with the partly darkened silver coating. In such a film, the ray A—B passed just once through the emulsion or pictorial layer 2. With a view to doubling the darkening and reducing the time of exposure to one-half, suggestions for the use of so-called double films have already been made. Such double films are represented in Fig. 2. They consisted of a transparent support I and two layers or emulsions 2, 2' with the partly darkened silver coating. The ray A—B, on passing through such double films, was therefore obliged to pass through two pictorial layers, viz., the layer 2 and the layer 2', the latter being arranged parallel to the former, so that the picture viewed by the observer possessed a double degree of darkening.

The conditions were very much more unfavourable when opaque supports, e. g., paper, were used. Fig. 3 shows how a ray of light emanating from an ordinary electric bulb or some similar source of light is projected on the paper. When this happens, the ray C—D—E has to pass through emulsion 2 with the partly darkened silver coating, until it reaches the opaque support, e. g., the paper I'. From point E it is reflected—through the same layer 2 with the silver coating—in the direction F—G, so that the eye H ought to perceive twice the degree of darkening at the darkened spots if it were not for the fact—already mentioned in the introductory part of the description—that a considerable diminution of the darkening takes place in connection with the method shown by Fig. 3 even at the darkened spots, this being due to surface reflexion and being in conflict with the theoretical assumptions.

In order to avoid these disadvantages, it is proposed in accordance with the present invention to dye with a solution of rhodamine or some other material the paper support 1' shown in Fig. 4, such support possessing an emulsion layer with a partly darkened silver coating. Such treatment may take place prior to exposing the photographic paper to the light, prior to printing, during the time of exposure, or even after the completion of the picture.

The paper support 1' thus dyed with rhodamine is then irradiated with green rays emitted by the source of light 4. The source of light may be one of those whose spectrum consists for the most part of green rays, e. g., an illuminated tube (a mercury vapour lamp). The green and ultraviolet rays C—D—E impede upon the paper support 1' dyed with rhodamine and there cause fluorescence in the rhodamine dye, so that the colour particles reached by the rays C—D—E generate fluorescent light in the complementary colour, i. e., in the case here concerned red rays E—F—G. The images emitting the red fluorescent light are observed through a red colour filter 8, which may be in the form of spectacles or goggles and is of such kind that it allows to pass without weakening them the red fluorescent rays E—F—G emanating (Fig. 4) from the rhodamine contained in the support 1', whilst the rays of different colour, and therefore of different wave-length, more especially the green rays C—D—E emitted by the source of light, are absorbed by it. According to the present invention, the eye H perceives a red image of rays emanating from the rhodamine.

Fig. 5 represents a different form of applying the invention. According to it, green rays of light and invisible ultra-violet rays are emitted from a mercury vapour lamp 5 on to the support 1' which has first been impregnated with rhodamine. The rays C—D—E cause the rhodamine to fluoresce and are reflected to the eye H of the observer as red rays E—F—G. Here, too, the picture is viewed under a filter 8 in the same manner.

Fig. 6 again represents a different form of applying the invention. In this case, the arc lamp 6 serves as a source of light. It emits large quantities of green as well as ultraviolet rays and, in addition, large quantities of rays of different wave-lengths. Accordingly, a filter 7 is used in this case. It allows the green and ultraviolet rays to pass, but absorbs the others. Colour filters of that kind are commercially available. The pictures are again viewed, in the manner previously described, through a red colour filter 8.

When, as shown by Fig. 5, a mercury vapour lamp is used which only emits green and ultraviolet rays, there is no need for a colour filter before the source of light.

In the method according to the invention, the phenomenon of surface reflexion and, therefore, the flattening of the density curve at a density value of 0.9, are absent, because the green rays C—D—E according to Fig. 4, which are reflected at the surface of the picture, are completely absorbed by the red filter 8 inserted before the eye H of the observer. Any ultraviolet rays that might also be reflected at the surface of the picture are invisible in any case, and are—besides—absorbed by the red filter 8 as well. Accordingly, even the deepest gradations produce their effect, which means that the contrasts are augmented. The fact, however, that—with a view to the production of fluorescent irradiation—both visible rays of light and simultaneously invisible ultraviolet rays are used makes it possible to give an exceptionally high degree of brightness to the pictures. It is obvious from the description here given that, instead of artificial sources of light, it will be equally admissible to use natural day light with an appropriate filter.

The process according to the invention is not, however, limited to opaque pictures, but may also be applied to transparent ones. In this case, the transparency—e. g., a diapositive or an X-ray film according to Fig. 1 or 2—is pressed against a support made to fluoresce in the manner already described. It is then irradiated with green or with green and ultraviolet rays and is viewed through a red filter. The augmentation of the contrasts in the transparency is here optically doubled, inasmuch as both the incident and the reflected rays of light are weakened at the darkened spots. Seeing that surface reflexion is likewise eliminated, the enlargement of the range of contrasts is particularly noticeable according to the new method of observation as compared with the customary method of doing so. The range of contrasts, indeed, is doubled.

A still different form of applying the invention is shown by Fig. 7, inasmuch as it is applied to projection by an episcope. Reference has already been made to the disadvantages inherent in that method of projection as compared with projection in transmitted light. The process according to the invention can be used, however, with great advantages when applied to projection by an episcope. A diagrammatic view of it is shown by Fig. 7. The appliance consists, in the main, of a casing 9 in which a suitable source of light 10 is accommodated which, for example, emits green and ultra-violet rays. These are made to pass by a condenser 11 to a paper image 12 impregnated with rhodamine and then through the emulsion 13 in the direction H—J—K, after which a mirror 13' reflects them through the projection tube 14 with the object lens 15 in the direction L. Finally, they are projected towards a screen in the customary manner. The episcope may be placed in known manner upon some support 16, e. g., a table, etc. Between the picture and the eye, a filter 17 has to be inserted which only allows the red rays of light to pass through. It is not necessary, however, to insert it directly before the observer's eye, its most suitable position being immediately before the projection tube 14 of the episcope. This eliminates the necessity of handing over an observation filter to every observer.

Substances other than rhodamine may be used according to the invention, especially in the case of transparent images. In this case use is conveniently made of fluorescent foils which are made of inorganic substances. These substances have the advantage of great stability to light and at the same time give a fluorescent radiation of considerable brightness. Also the colours mentioned above are only given by way of example. Illumination may be effected just as well with a blue light in the case of yellow fluorescent radiation, a yellow filter being employed for observing; or some other combination may be employed, as long as the fluorescent radiation is of a colour complementary to that of the source of light and observation or projection is effected through a filter which has the same colour as that of the fluorescent radiation.

I claim:

1. A picture comprising a photographic image and a support for said image, said support containing rhodamine in such amount that when exposed to mono-chromatic light from the visible part of the spectrum and to invisible ultra-violet radiation at the same time it emits a fluorescent light the colour of which is complementary to said mono-chromatic light.

2. A picture comprising a photographic image and a support for said image, said support containing a zinc sulphide in such amount that when exposed to monochromatic light from the visible part of the spectrum and to invisible ultra-violet radiation at the same time it emits a fluorescent light the colour of which is complementary to said mono-chromatic light.

3. A method of viewing a picture comprising a photographic image and a support for said image, said support containing a substance which when exposed to mono-chromatic light from the visible part of the spectrum and to invisible ultra-violet radiation at the same time emits a fluorescent light the colour of which is complementary to said mono-chromatic light, said method consisting in exposing said picture to mono-chromatic light from the visible part of the spectrum and to invisible ultra-violet radiation at the same time and looking at said picture through a filter the colour of which is complementary to that of said light.

4. In combination, a source of monochromatic light and ultra-violet rays, a photographic image and a support therefor containing fluorescent material, and a transparent filter in the path of light emanating from said source and reflected by said image, said filter being of a color complementary to the color of light emanating from said source.

5. In combination, a source of monochromatic light and ultra-violet rays, a photographic image and a support therefor containing rhodamine, and a transparent filter in the path of light emanating from said source and reflected by said image, said filter being of a color complementary to the color of light emanating from said source.

6. In combination, a source of monochromatic light and ultra-violet rays, a photographic image and a support therefor containing a fluorescent zinc sulphide, and a transparent filter in the path of light emanating from said source and reflected by said support, said filter being of a color complementary to the color of light emanating from said source.

HANS LEWIN.